June 9, 1964  D. W. THOMPSON  3,136,616
CONTINUOUS CHROMATOGRAPHIC SEPARATION PROCESS
Filed March 18, 1960  3 Sheets-Sheet 1
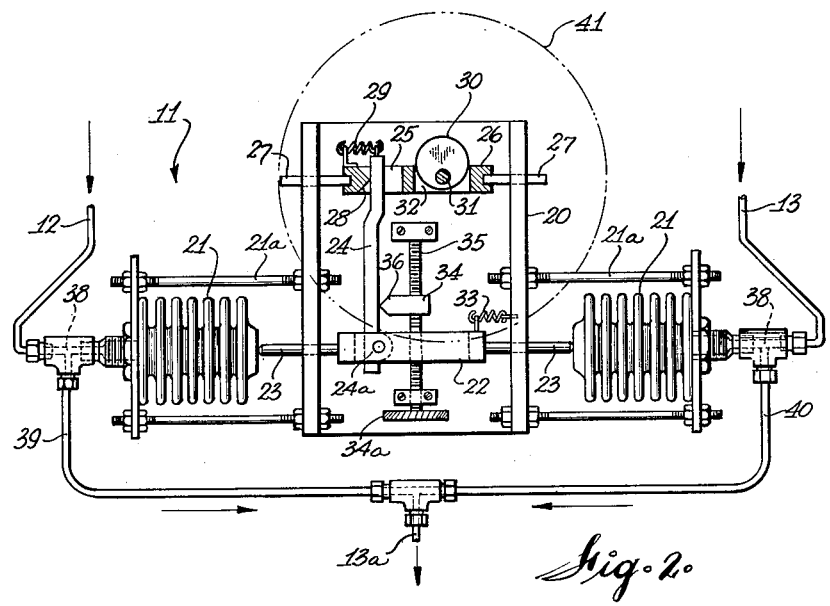
Fig. 2.
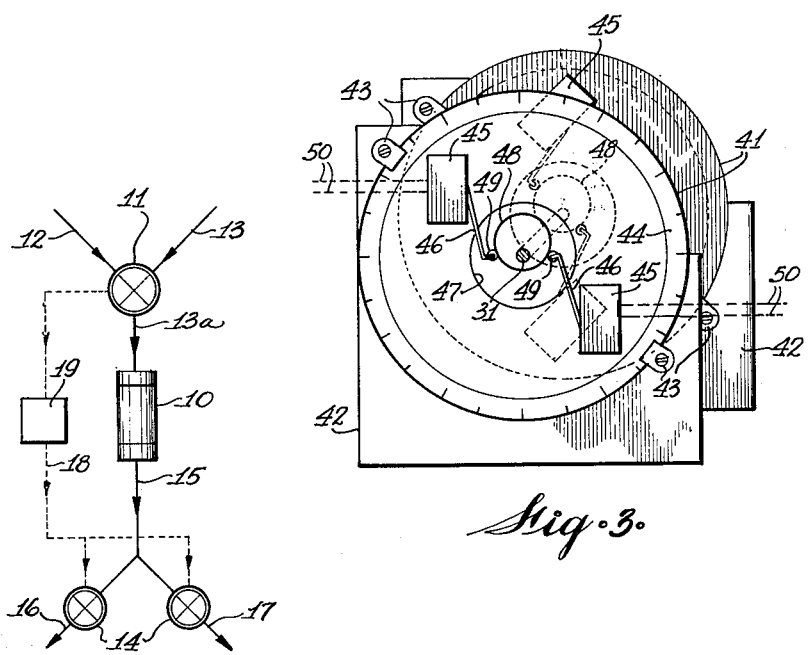
Fig. 3.
Fig. 1.
INVENTOR
Donald W. Thompson
BY Alex. E. MacRae
ATTORNEY INVENTOR
Donald W. Thompson
BY Alex. E. MacRae
ATTORNEY

United States Patent Office 3,136,616
Patented June 9, 1964

3,136,616
CONTINUOUS CHROMATOGRAPHIC
SEPARATION PROCESS
Donald W. Thompson, Vancouver, British Columbia, Canada, assignor to Canadian Patents and Development Limited, Ottawa, Ontario, Canada
Filed Mar. 18, 1960, Ser. No. 16,070
4 Claims. (Cl. 55—67)

This invention relates to a continuous chromatographic separation process.

Chromatographic processes as presently widely used for analytical and preparative work are essentially batch processes and while good separations are often obtained the amount of material that can be handled is relatively small. Even if columns could be built of much larger diameter than at present the pressure drop and large amount of carrier gas employed for circulation frequently makes the process uneconomical on an industrial scale.

In such a batch partition chromatographic process the sample is injected as a single, short duration, pulse into an inert carrier stream. This transports the sample through a fixed bed where, if each component of the original mixture has a different partition coefficient between bed and stream, the original pulse is resolved into a series of concentration peaks which emerge successively from the end of the column.

It is an object of this invention to provide a continuous chromatographic separation process wherein a greatly increased amount of material may be treated in a given period of time, and wherein such increased amount of material may be treated in a much shorter column while employing a relatively small quantity of carrier.

The invention resides in a continuous chromatographic separation process which comprises continuously feeding a material having a plurality of components to be separated and a carrier fluid in a periodic composition wave of constant frequency to the inlet of a chromatographic column, said components having different equilibrium distributions between the stationary and mobile phase thereof and said column differentially retarding the passage of said components therethrough whereby said components travel through said column in respective waves at different rates, said waves thereby emerging from said column out of phase with each other, and separating said component waves as they emerge from said column. Thus, in accordance with the invention, the material sample is mixed with a carrier stream continuously in periodically varying concentration for passage through a chromatographic column of conventional form. The amount of sample in the carrier stream may be caused to vary sinusoidally by means of a wave generator over a wide concentration range at a fixed frequency. If the sample consists, for instance, of two components, the concentrations of each of them may be regarded as sine waves which enter the column in phase with each other and travel down it. The flow rate through the column is maintained substantially constant. It is proposed that the process of the invention will be carried out in a plurality of successive stages each of the type to be hereinafter described, partial enrichment being obtained in each stage, and the successively enriched streams being separated between stages.

If the stationary phase has been chosen so that the components to be separated have different equilibrium distributions between the stationary and the mobile phase or if the components have different rates of transfer from one phase to another then the two waves will travel through the column at different rates and will therefore emerge out of phase with one another. The outlet stream from the column is split into two streams one of which is rich in one of the components and the other of which is rich in the other component by a suitable valve arrangement operating at the same frequency as the wave generator and at the corresponding phase angles. A third, less enriched, stream may also be split off and recycled. The invention will be more particularly described with reference to the accompanying drawings in which:

FIGURE 1 is a diagrammatic view of an apparatus for carrying out the invention,

FIGURE 2 is a side elevation of the wave generator portion of the apparatus,

FIGURE 3 is a perspective view of an outlet valve timing device,

Figure 4:
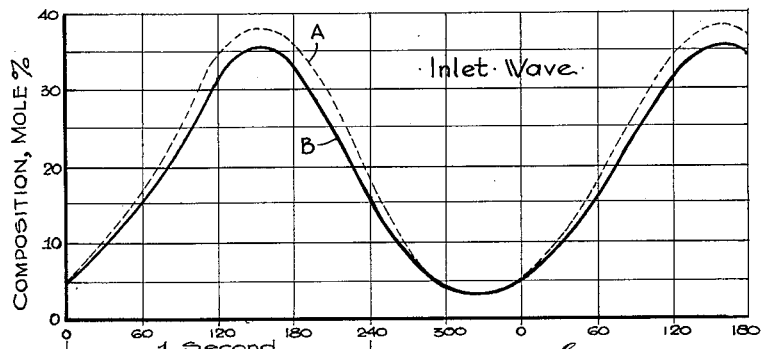
FIGURE 4 is an inlet wave form diagram.

Referring to FIGURE 1, 10 is a chromatographic column of conventional form. It may be packed with or contain any suitable substance depending upon the particular materials under treatment. The wave generator is indicated at 11. The inlet line for the mixture or material sample is indicated at 12, the inlet line for the carrier at 13, and the column inlet line leading from the wave generator to the column at 13a. The stream splitter may comprise a pair of electrically actuated valves 14 connected to the outlet line 15 whereby the outlet stream is split into a line 16 for one component and a line 17 for the other component. A timing signal electrical connection 18 having a variable delay 19 therein connects the wave generator with the valves 14.

A suitable wave generator structure is illustrated in FIGURE 2 and comprises a frame 20 and a pair of axially aligned bellows 21 each mounted for axial adjustment as by means of an auxiliary frame 21a therein. A bar 22 having end rods 23 is reciprocally mounted in the frame, the ends of the rods being engageable with the inner ends of the bellows to alternately apply collapsing pressure thereto in response to reciprocating movement of the bar 22. Means for reciprocating the bar 22 comprises an arm 24 attached to the bar by a pivot 24a and having a portion extending into a slot 25 in a block 26 which is reciprocally mounted in the frame as by means of end rods 27. The arm 24 is held in contact with a wall portion 28 of the slot by means of a spring 29 connecting the arm and block 26.

A cam or eccentric 30 is mounted on a driven shaft 31 and engages the walls of a slot 32 in block 26 whereby on revolution of the cam by means of the shaft, reciprocation will be imparted to the block 26 and bar 22 in one direction. Reciprocation of the bar 22 in the other direction is effected by means of a spring 33 connecting the bar and the frame. The spring 33 exerts a force sufficient to hold the arm 22 firmly against a fulcrum 36, about which it can pivot. The fulcrum is mounted on a block 34, the position of which can be adjusted along a threaded shaft 35 by rotating knob 34a. The position of the fulcrum determines the length of stroke of the reciprocating motion imparted to bar 22 and hence to the bellows 21.

Each bellows 21 communicates with a T junction 38. The mixture feed line 12 communicates with one T 38 and a line 39 for the pulsating mixture feed leads from the latter T to the column feed line 13a. The carrier feed line 13 communicates with the other T 38 and a line 40 for the pulsating carrier feed leads from such T to the column feed line 13a. The two pulsating streams are combined at the column feed line 13a so that the maximum flow of the carrier occurs at the same time as the minimum flow of the mixture and vice versa. By suitable adjustment of the flow rates and of the amplitude of oscillation of the bellows, a stream of constant flow rate is obtained at the column feed line 13a and the composition of this stream is observed to vary approximately sinusoidally from nearly pure mixture to nearly pure carrier. The frequency of this oscillation is of course the same as the frequency of rotation of the drive shaft 31 of the wave generator. Assuming that the sample mixture has two components with different equilibrium distributions between the phases, or different rates of transfer from one phase to another two component waves will be produced in the column and will travel therethrough at different rates and therefor will emerge from the column into the outlet line 15 out of phase with each other.

Figure 5:
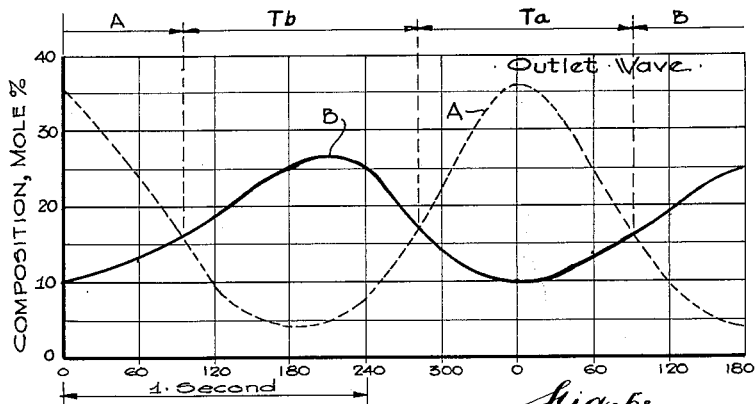
FIGURE 5 is an outlet wave form diagram.

This procedure is illustrated diagrammatically in FIGURES 4 and 5 wherein FIGURE 4 shows the inlet waves of a mixture of two components A and B at the concentration indicated, and FIGURE 5 shows the outlet concentration waves. It will be apparent that, if one valve 14 is opened only during the time interval $T_a$ and the other valve 14 opened only during the time interval $T_b$ (as indicated in FIGURE 5) an A rich stream will flow through outlet line 16 and a B rich stream will flow through outlet 17. It will also be apparent that the frequency of operation of such valves must be the same as the frequency of the wave generator 11.

to permit rotation of the disk to any desired position and tightened to lock the disk in selected position. A scale 44 may be applied to the periphery of each disk to identify the position thereof. A pair of microswitches 45 are mounted on each disk, each microswitch having an actuating arm 46, the free end of which lies opposite an axial opening 47 in the disk. The driven shaft 31 extends through the openings 47 and carries a pair of cams 48. The peripheral cam surface of each cam 48 engages the free ends of a corresponding pair of switch actuating arms 46. Such free ends may be provided with cam engaging rollers 49. A portion of the electrical circuit of each microswitch is indicated at 50, such circuits forming part of the general electrical connection indicated at 18 in FIGURE 1. Included in each circuit is conventional actuating means (not shown) for opening and closing each valve 14. It will be apparent that adjustment of the disks 41 will serve to place the microswitches thereon in proper position to open and close the valves at the correct points in each cycle.

The following table gives the results of tests conducted at room temperature and using a column packed with 200–230 mesh silica gel. The column dimensions were 8 mm. long and 4 mm. diameter, the flow rate 82 cc./min., and the mean concentration of vapor in the inlet stream 35%. The outlet stream was split into two equal portions (A and B) by valves operating at the same frequency as the wave generator.

*Table I*

| Vapour mixture | Carrier gas | Frequency, cycles/min. | Outlet stream A | | Outlet stream B | |
|---|---|---|---|---|---|---|
| | | | Composition (carrier free) | Vapour concentration, percent | Composition (carrier free) | Vapour concentration, percent |
| Ethane 51%; Ethylene 49%. | Helium | 60 | Ethane 53.3%; Ethylene 46.7%. | 59 | Ethane 38.6%; Ethylene 61.4%. | 11 |
| Do | Nitrogen | 60 | Ethane 58.0%; Ethylene 42.0%. | 45.8 | Ethane 37.8%; Ethylene 62.2%. | 24.3 |
| Ethane 51%; Propane 49% | do | 40 | Ethane 61.4%; Propane 38.6%. | 40.5 | Ethane 37.1%; Propane 62.9%. | 29.8 |
| Do | Carbon dioxide. | 40 | Ethane 69.5%; Propane 30.5%. | 40.1 | Ethane 26.2%; Propane 73.8%. | 30.0 |
| Methane 49%; Ethane 51%. | Helium | 80 | Methane 64.4%; Ethane 35.6%. | 41.1 | Methane 27.4%; Ethane 72.6%. | 28.6 |

Figure 6:
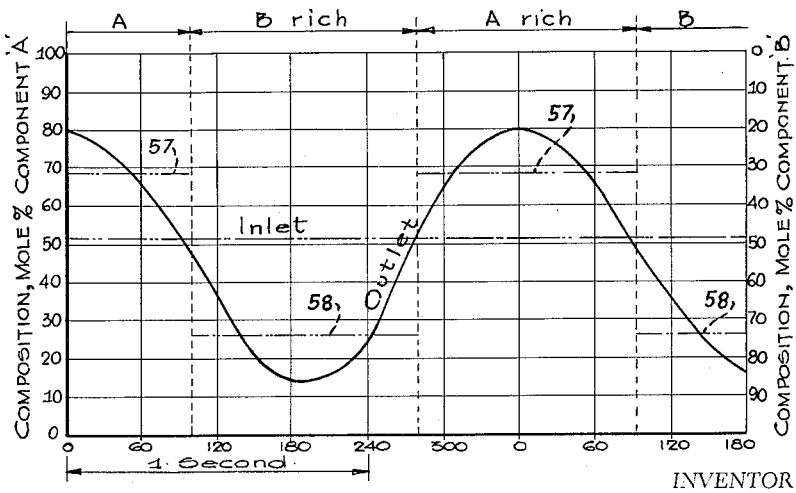
FIGURE 6 is a diagram illustrating the composition of the inlet and exit streams on a carrier-free basis.

FIGURE 6 illustrates diagrammatically the composition of the A and B component mixture on a carrier free basis. The composition at the inlet and outlet is as indicated by the respectively labelled lines. The horizontal doted lines 57 indicate the mean composition of the A rich outlet stream and the horizontal dotted lines 58 indicate the mean composition of the B rich outlet stream.

A suitable form of timing arrangement for the operation of valves 14 is illustrated in FIGURE 3. It comprises a pair of axially aligned disks 41 each fixed to a frame member 42 by means of brackets 43 which may be loosened The following table gives the results of tests conducted at room temperature and using a column packed with 200–230 mesh firebrick coated with benzyl ether. The column dimensions were 16 mm. long and 4 mm. diameter, the flow rate 85 cc./min., and the mean concentration of vapor in the inlet stream 50%. Again, the outlet stream was split into two approximately equal portions (A and B) by valves operating at the frequency as the wave generator.

*Table II*

| Vapour mixture | Carrier gas | Frequency, cycles/min. | Outlet stream A | | Outlet stream B | |
|---|---|---|---|---|---|---|
| | | | Composition (carrier free) | Vapour concentration, percent | Composition (carrier free) | Vapour concentration, percent |
| Butene-1 84%; Propylene 16%. | Helium | 80 | Butene-1 88.5%; Propylene 11.5%. | 51 | Butene-1 79%; Propylene 21%. | 49 |

It will be understood that, in commercial practice, it may be desirable to arrange a number of the continuous separation units described in cascade. In each unit, the stream would be diluted with carrier and, therefore, reconcentration stages would be employed between each pair of units or series of units.

Figure 7:
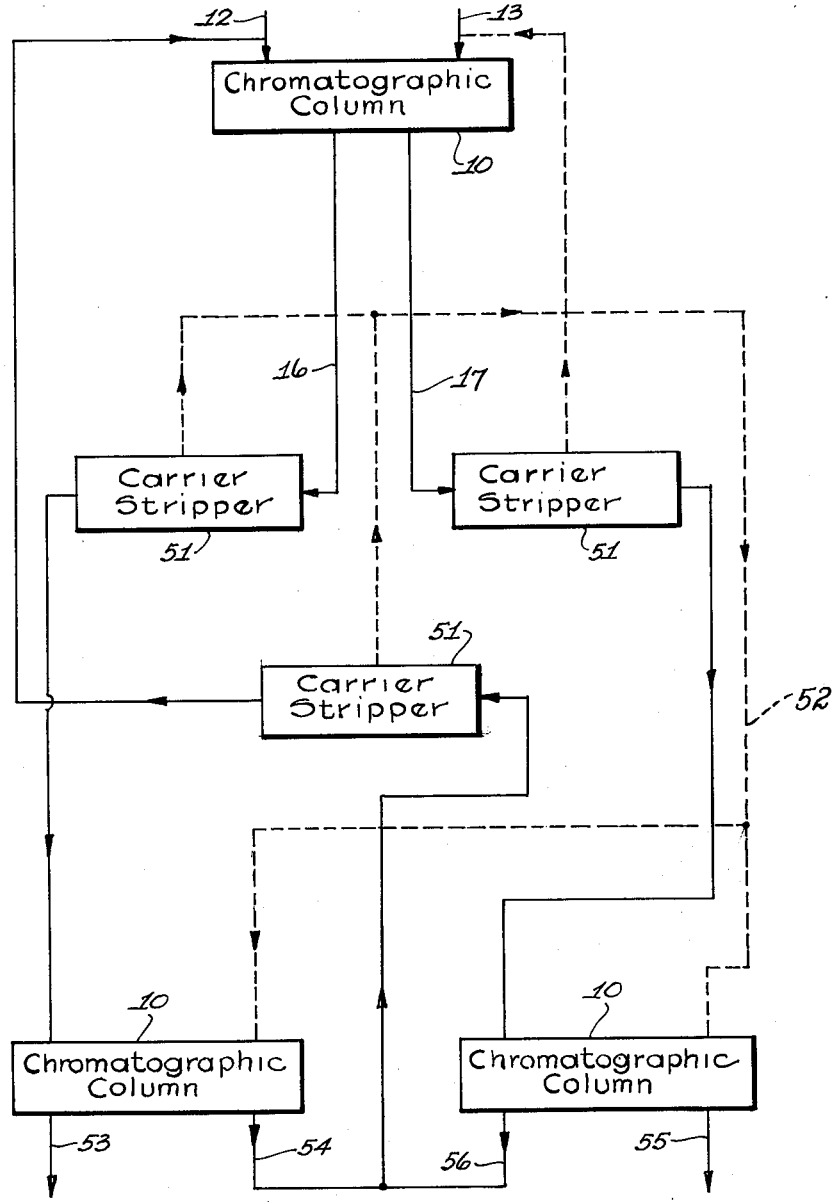
FIGURE 7 is a flow sheet of a multiple stage process in accordance with the invention.

FIGURE 7 illustrates a multiple stage process in accordance with the invention wherein the chromatographic columns are indicated at 10 (including wave generator 11) and 51 are conventional carrier stripper units. It will be observed that the stream portions in lines 16 and 17 are each subjected to a second stage treatment in a second column 10 similar in all respects to the first column. The amount of carrier in each case is adjusted by removing carrier from each stream portion by a conventional stripper 51 and adding carrier thereto by means of a carrier return line 52 leading from the strippers. The A component enriched stream fed through one of the second columns is split thereby into a more enriched A component stream portion in line 53 and a less enriched A component stream portion (also containing traces of B component) in line 54. The B component enriched stream portion fed through the other second column is thereby split into a more enriched B component stream portion in line 55 and a less enriched B component stream portion (also containing traces of A component) in line 56. The lines 54 and 56 containing the less enriched components are recycled back through the first column 10 after removing carrier therefrom by a stripper 51 and adding an appropriate amount of carrier thereto.

It will be apparent that additional stages of treatment may be carried out by arranging additional separation units in cascade as illustrated in FIGURE 7.

I claim:
1. In a chromatographic separation process for treating a supply stream of a carrier gas and a vapour mixture having a plurality of components to be separated, said components having different equilibrium distributions between the stationary and mobile phases thereof, the improvement which comprises feeding to a supply line said vapour mixture and said carrier gas in alternate pulses at fixed frequency of a multiplicity of cycles per minute to provide a supply stream having therein a periodic wave of fixed frequency and wherein said vapour mixture varies sinusoidally over a variable concentration range in said carrier gas, continuously feeding said supply stream through said supply line at a constant rate to the inlet of a chromatographic column, said column differentially retarding the passage of said components therethrough, said components in said supply stream during passage thereof through said column each thereby having a wave generated by said periodic wave of mutually different phase relation as a result of said different equilibrium distributions, said supply stream during said passage thereby splitting into stream portions of differential wave form each rich in a respective one of said components, and separating said stream portions from each other as they emerge from said column.

2. In a chromatographic separation process for treating a carrier and a material having a plurality of components to be separated, said components having different equilibrium distributions between the stationary and mobile phases thereof, the improvement which comprises feeding to a supply line said material and said carrier in alternate pulses at fixed frequency of a multiplicity of cycles per minute to produce a supply stream having therein a periodic wave of fixed frequency and wherein said material varies sinusodially over a variable concentration range in said carrier, continuously feeding said supply stream through said supply line at a constant rate to the inlet of a chromatographic column, said column differentially retarding the passage of said components therethrough, said components in said supply stream during passage thereof through said column each thereby having a wave generated by said periodic wave of mutually different phase relation as a result of said different equilibrium distributions, said supply stream during said passage thereby splitting into stream portions of differential wave form each rich in a respective one of said components, and separating said stream portions from each other as they emerge from said column.

3. In a chromatographic separation process for treating a carrier and a material having a plurality of components to be separated, said components having different equilibrium distributions between the stationary and mobile phases thereof, the improvement which comprises subjecting said carrier and said material to a first stage comprising the successive steps of feeding to a supply line said material and said carrier in alternate pulses at fixed frequency of a multiplicity of cycles per minute to provide a supply stream having therein a periodic wave of fixed frequency and wherein said material varies sinusoidally over a variable concentration range in said carrier, continuously feeding said supply stream through said supply line at a constant rate to the inlet of a chromatographic column, said column differentially retarding the passage of said components therethrough, said components in said supply stream during passage thereof through said column each thereby having a wave generated by said periodic wave of mutually different phase relation as a result of said different equilibrium distributions, said supply stream during said passage thereby splitting into first stream portions of differential wave form each rich in a respective one of said components, separating said stream portions from each other as they emerge from said column, and removing carrier from each of said stream portions, and subjecting each of said separated first stream portions to a second stage which comprises the steps of feeding to a supply line said separated stream portion and a carrier in alternate pulses at fixed frequency to provide a second supply stream having therein a periodic wave of fixed frequency, continuously feeding said second supply stream to the inlet of a second chromatographic column, said second supply stream during its passage through said second column thereby splitting into second stream portions one of which is more enriched and one of which is less enriched with respect to one of said components, and separating said second stream portions from each other as they emerge from said second column.

4. A chromatographic separation process as defined in claim 3, including the step of recycling said less enriched second stream portions through said first stage.

References Cited in the file of this patent
UNITED STATES PATENTS

| | | |
|---|---|---|
| 2,620,894 | Peterson et al. | Dec. 9, 1952 |
| 2,839,152 | Tracht | June 17, 1958 |
| 2,889,701 | Skarstrom | June 9, 1959 |